United States Patent
Li et al.

(10) Patent No.: US 8,560,664 B2
(45) Date of Patent: *Oct. 15, 2013

(54) METHOD AND APPARATUS FOR PROVIDING PEER SELECTION IN A NETWORK

(75) Inventors: Jian Li, San Ramon, CA (US); Zhi Li, Martinez, CA (US); Sun-Uk Park, Union City, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,041

(22) Filed: Sep. 14, 2012

(65) Prior Publication Data
US 2013/0013694 A1    Jan. 10, 2013

Related U.S. Application Data

(63) Continuation of application No. 12/341,675, filed on Dec. 22, 2008, now Pat. No. 8,285,829.

(51) Int. Cl.
*G06F 15/173*    (2006.01)

(52) U.S. Cl.
USPC .......... 709/223; 709/203; 709/217; 709/225; 342/450

(58) Field of Classification Search
USPC ................ 709/223, 217, 225, 203, 201, 227; 342/450, 458
See application file for complete search history.

(56) References Cited

U.S. PATENT DOCUMENTS

| | | | |
|---|---|---|---|
| 7,145,892 B2 | 12/2006 | Quinn et al. | |
| 7,340,500 B2 | 3/2008 | Traversat et al. | |
| 7,584,261 B1 | 9/2009 | Teodosiu et al. | |
| 8,285,829 B2 | 10/2012 | Li et al. | |
| 2003/0120634 A1 | 6/2003 | Koike et al. | |
| 2011/0145376 A1* | 6/2011 | Bates et al. | 709/221 |
| 2011/0238756 A1 | 9/2011 | Damola et al. | |

* cited by examiner

*Primary Examiner* — Frantz Jean

(57) ABSTRACT

A method and apparatus for providing peer selection in a network are disclosed. For example, the method requests peer information from an application server supporting a Peer-to-Peer (P2P) service, and receives the peer information comprising a plurality of peer endpoint devices. The method then selects a peer endpoint device from the plurality of peer endpoint devices based on at least one preference.

20 Claims, 4 Drawing Sheets

METHOD AND APPARATUS FOR PROVIDING PEER SELECTION IN A NETWORK

This application is a continuation of U.S. patent application Ser. No. 12/341,675, filed Dec. 22, 2008, which is currently allowed and is herein incorporated by reference in its entirety.

The present invention relates generally to communications networks and, in particular, to a method and apparatus for providing peer selection in networks, e.g., Internet Protocol (IP) networks, Voice over Internet Protocol (VoIP) networks, Service over Internet Protocol (SoIP) networks, etc.

BACKGROUND OF THE INVENTION

As the popularity of peer-to peer (P2P) communications has increased, the amount of network capacity consumed by P2P applications has increased. For example, customers may share content such as audio, video, and data files, using P2P communications. The peer endpoint devices may be located anywhere with an Internet access. Hence, the communication between the peer endpoint devices may be over large distances, e.g., thousands of miles.

Internet Service Providers (ISPs) may then have to dedicate a large amount of their core and edge network capacity for handling P2P traffic. As the usage of P2P applications grows, an ISP may be unable to support millions of P2P application users in a cost effectively manner. Furthermore, the P2P traffic may overload the network, thereby causing a degradation of the performance of the entire network.

SUMMARY OF THE INVENTION

In one embodiment, the present invention discloses a method and apparatus for providing peer selection in a network. For example, the method requests peer information from an application server supporting a Peer-to-Peer (P2P) service, and receives the peer information comprising a plurality of peer endpoint devices. The method then selects a peer endpoint device from the plurality of peer endpoint devices based on at least one preference.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing peer selection in a network. Although the present invention is discussed below in the context of IP networks, the present invention is not so limited. Namely, the present invention can be used for other networks such as cellular networks, wireless networks, and the like.

Figure 1:
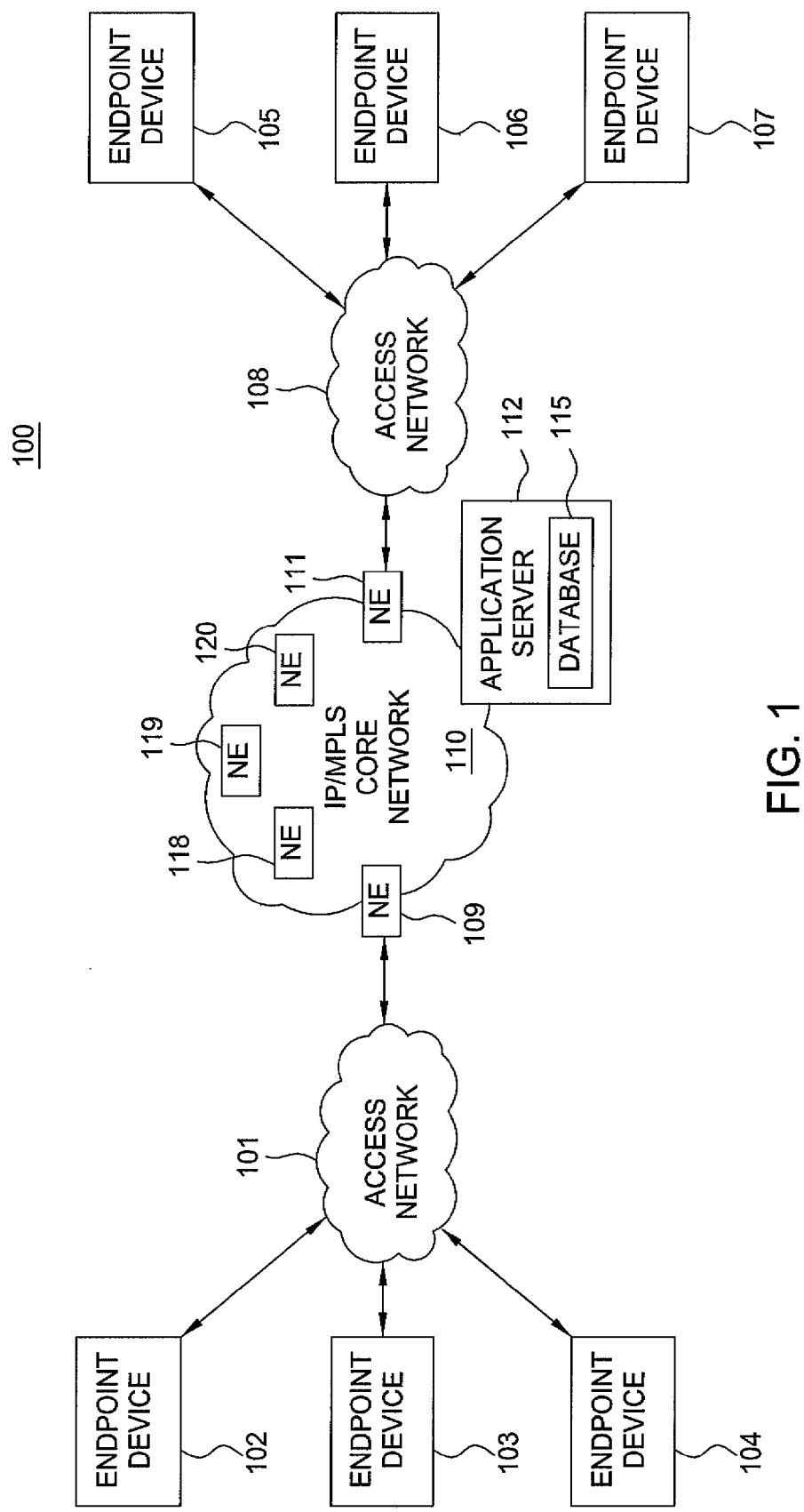
FIG. 1 illustrates an exemplary network related to the present invention.

FIG. 1 is a block diagram depicting an exemplary network 100 provided in accordance with one or more aspects of the invention. In one embodiment, a plurality of endpoint devices 102-104 is configured for communication with the Internet Protocol (IP) core network 110 via an access network 101. Similarly, a plurality of endpoint devices 105-107 are configured for communication with the IP core network 110 (e.g., a core backbone network supported by a network service provider) via an access network 108. The network elements 109 and 111 may serve as gateway servers or edge routers for the network 110.

The endpoint devices 102-107 may comprise customer endpoint devices such as personal computers, laptop computers, personal digital assistants (PDAs), servers, and the like. The access networks 101 and 108 serve as a conduit to establish a connection between the endpoint devices 102-107 and the network elements (NEs) 109 and 111 of the core network 110. The access networks 101, 108 may each comprise a digital subscriber line (DSL) network, a broadband cable access network, a local area network (LAN), a wireless access network (WAN), the Internet, and the like.

Some network elements (e.g., NEs 109 and 111) may reside at the edge of the core infrastructure and interface with customer endpoints for signaling and routing purposes over various types of access networks. An NE is typically implemented as an edge router, a media gateway, a border element, a firewall, and the like. An NE may also include a component that resides within the network (e.g., NEs 118-120) such as a mail server or like devices.

The IP core network 110 may also comprise an application server 112 that contains a database 115. The application server 112 may comprise any server or computer that is well known in the art, and the database 115 may be any type of electronic collection of data that is well known in the art. It should be noted that although only six endpoint devices, two access networks, five network elements (NEs), and one application server are depicted in FIG. 1, the communication system 100 may be expanded by including additional endpoint devices, access networks, network elements, and application servers without altering the scope of the present invention.

The above IP network is described to provide an illustrative environment in which voice, data, and video packets are transmitted on communication networks. In one embodiment, the current invention provides a method and an apparatus for providing peer selection in a network. In order to clearly describe the current invention, the following network terminologies are first provided.

Peer-to-Peer (P2P); and
Peer-to-Peer (P2P) network.

Peer-to-Peer (P2P) refers to a type of communication among users over a network (e.g., the Internet) that enables two or more users to communicate with each other, without fixing which of the users are clients and which of the users are servers. That is, P2P is a communications model in which each user has the same capability and may initiate a communications session. For example, each user may have the same application program in an endpoint device and may function as both a client and a server for sharing content, e.g., audio, video, data files, etc., without an assistance from a centralized server. For example, the content may be any form of data storable in a digital format.

Peer-to-Peer (P2P) network refers to a network of customer endpoint devices (e.g., computers), where each endpoint device may act both as a client and as a server, and may temporarily interconnect with another endpoint device for sharing content without an assistance from a centralized server. For example, if two computers have the same peer-to-peer application program, then the users may share content without any interference or assistance from a centralized server. For example, one user may run the P2P application to access files located in the hard drive of another user's computer.

Note that each user may set restrictions on which files in the hard drive of the user's own computer are accessible via the P2P application. For example, if a first user attempts to access a file in a second user's computer, the access is allowed only if the second user has allowed the P2P application to access the requested file. Otherwise, the access request is denied.

As the popularity of peer-to peer communications has increased, the amount of network capacity consumed by P2P applications has increased. Internet Service Providers (ISPs) may then have to dedicate a large amount of core and edge network transport capacity for handling P2P traffic. As the usage of P2P applications grows, the cost to an ISP may increase significantly in order to support a large number of P2P application users.

One approach of reducing the network capacity consumed by P2P applications is to block or reduce a customer's P2P traffic. However, the customer may not wish the ISP to examine and filter his/her traffic. Furthermore, the idea of placing a restriction on Internet access based on a customer's selection of a type of service runs counter to the Internet's original intent. Most customers would expect to have the freedom of choosing a desired service without such intrusion from the network service provider.

Another approach is to provide the ISP's network information to the P2P application, such that the P2P application selects the peer endpoint device with a goal of reducing the impact on the ISP's network. However, this approach requires the ISP to share private network information with a P2P application vendor. This approach also requires the P2P application vendor to receive the ISP's private information and to customize the peer-to-peer application software such that the selection of a peer is optimized for the ISP's network environment. However, typically the ISP and the P2P application vendor are different enterprises with very different goals. Even if the enterprises were willing to share the information, ensuring that the P2P application keeps up with modifications in each ISP's network environment (e.g., adding new network elements, removing network elements, reconfiguring network elements, relocating network elements, and so on), would make such a solution very costly.

In one embodiment, the current method provides peer selection that is based on preferences. In one embodiment, the preference may be based on the proximity of a peer to a customer and/or which service provider is serving the peer (as further described below).

In one embodiment, the method first enables the P2P application to determine the physical location of the endpoint device on which the application is running and/or is being installed. In one embodiment, the P2P application in an endpoint device may receive the physical location from the user of the endpoint device when the application is invoked and/or being installed. For example, the user may be requested to enter a physical address, e.g., a street address, a postal zip code, city and/or state, etc. The user may then enter the requested physical address.

In one embodiment, the P2P application in an endpoint device may receive the physical location from a file stored in the endpoint device. For example, the address of the endpoint device may be in a file in a computer being used for P2P service.

In one embodiment, the P2P application in an endpoint device may receive the physical location from another device capable of determining the physical location. For example, the P2P application may be installed in an endpoint device that has a Global Positioning System (GPS) capability. For example, the endpoint device may be a smart phone with GPS capability that is being used for accessing Internet services.

In one embodiment, the method may then provide the physical location to an application server located in the P2P service provider's network. For example, the P2P application may send the physical location of the endpoint device on which it is running to an application server that tracks users of the P2P service.

In one embodiment, the application server may gather and track information for all users of the P2P application. The gathered information for each user of a P2P application may comprise: an IP address, the Internet Service Provider (ISP) serving the user (e.g., AT&T), and the physical location of the endpoint device on which the P2P application is running.

In one embodiment, the method may then query an application server for peering information for a type of service. For example, the P2P application in the customer's endpoint device may send a request to a P2P application server to obtain a list of peer endpoint devices that may have a desired content. Some examples of P2P application servers are a Skype (a peer to peer voice over Internet protocol) server, a Freenet server, a BitTorrent server, a Gnutella (gtk-Gnutella used over Linux operating systems) server, etc. The application server for the requested type of service may receive the query and provide a list of peers and their corresponding physical locations. For example, the application server may provide a list of ten peer endpoint devices for the type of service.

In one embodiment, the method may then receive the response from the application server that comprises a list of peer endpoint devices for the requested type of service and their corresponding physical addresses and/or their service provider. For the example above, the P2P application in the user's endpoint device may receive the list of ten peer endpoint devices along with the physical addresses and/or the service provider of each of the ten peer endpoint devices from the P2P application server for the desired type of service.

In one embodiment, the method may then organize or arrange the received peer endpoint devices in accordance with a preference. In one embodiment, the method arranges the received peer endpoint devices in an order based on the network service provider (e.g., the ISP). For example, a peer endpoint device served by the same ISP as that of the endpoint device running the P2P application may be preferred over another peer served by another ISP.

In one embodiment, the method organizes or arranges the received peer endpoint devices in an order based on a physical proximity. For example, the method may calculate air mileages between its own physical location (described above) and the location of each of the peer endpoint devices on the received list. The method may then order the received peer endpoint devices from the closest distance to the farthest distance from the endpoint device's own location. For the example above, the method may calculate the distance between the endpoint device on which the P2P application is running and each one of the 10 peer endpoint devices on the received list. The method may then arrange the peer endpoint devices in an order based on their proximity, e.g., first peer being the closest, second peer being the second closest, and so on.

In one embodiment, the network service provider establishes one or more rules for ordering the received peer endpoint devices. In one example, the network service provider (e.g., the ISP) may prefer the ordering of the received peer endpoint devices to be based only on physical distances. In another example, the network service provider may prefer the ordering of the received peer endpoint devices to be based only on using the same ISP. In yet another example, the network service provider may prefer that the ordering of the received peer endpoint devices be based on a combination of physical distances and ISP serving the peer endpoint devices.

In one illustrative example, a peer with a different ISP may be found within ten miles of the endpoint device, and a peer on the same ISP may be found 2,000 miles away. The service provider may prefer ordering the two peers with the physically closest peer being listed first, and the peer that is 2,000 miles away being listed second.

In one embodiment, the method then selects one of the peer endpoint devices based on the order. For the example above, the method may select the peer listed as being first in accordance with the preference (e.g., distance, ISP, a combination of distance and ISP). Once a peer is selected, the method may then interact with the selected peer, e.g., sharing content with the selected peer.

In one embodiment, the method may present the ordered peer endpoint devices to the user for selection. For the example above, the method may provide the list of the ten peer endpoint devices, ordered from the closest to the farthest and/or their respective service provider (ISP). The method may also provide the corresponding mileage for each of the presented peer endpoint devices for ease of use by the user.

However, in one embodiment, the mileage difference from the user's endpoint device to two consecutively listed peer endpoint devices may not be significant from the user's perspective. The user may then select a peer from among the peers of similar distance based on other criteria, e.g., previous experience with a particular peer, time zone differences, etc.

Figure 2:
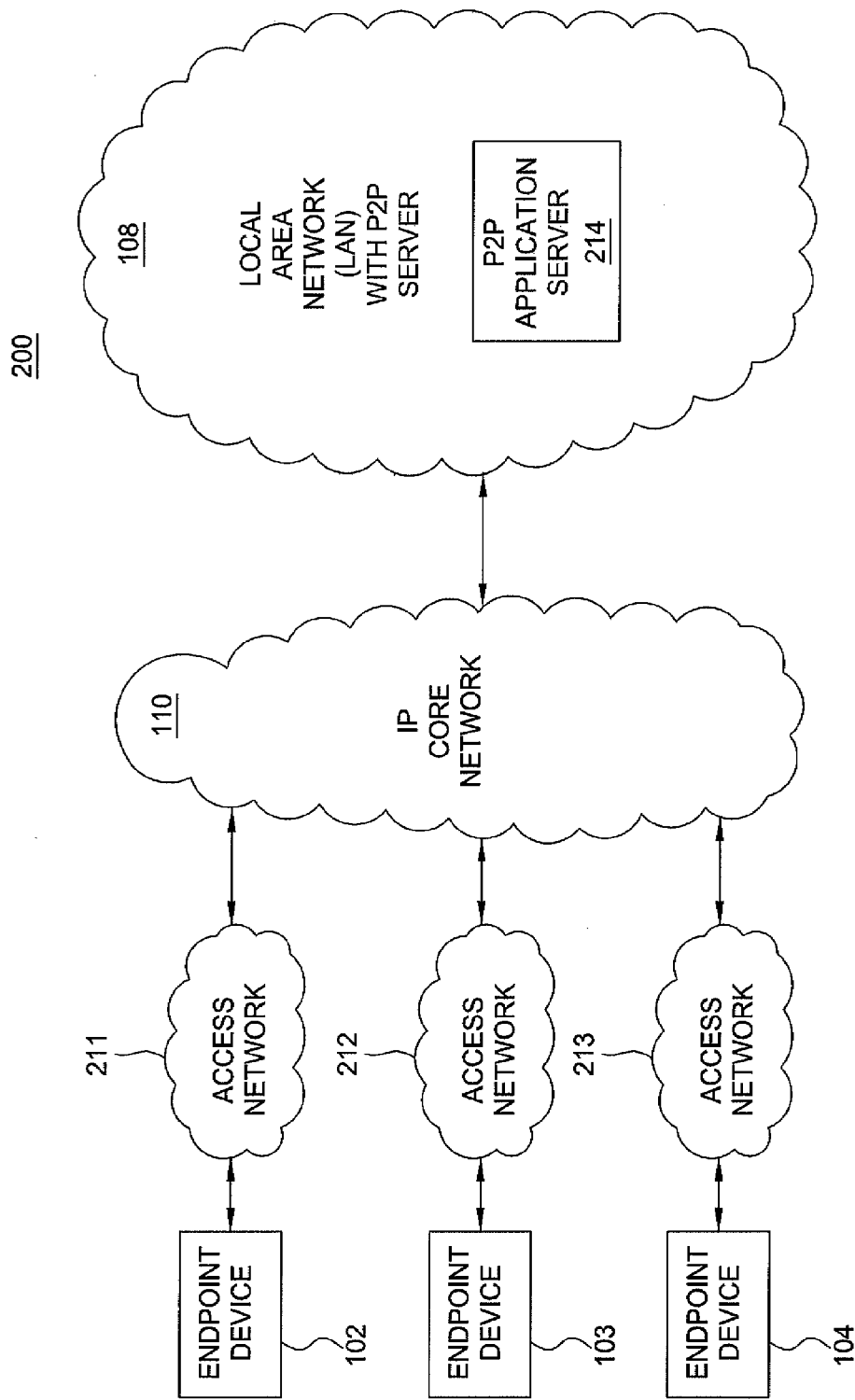
FIG. 2 illustrates an exemplary network for providing peer selection in a network.

FIG. 2 illustrates an exemplary network 200 for providing peer selection in a network. In one embodiment, the network 200 comprises customer endpoint devices 102, 103 and 104 accessing services from IP core network 110 through the access networks 211, 212 and 213, respectively. An enterprise providing a P2P application has a Local Area Network (LAN) 108 in communication with the IP core network 110. The LAN 108 also comprises a P2P application server 214 for interacting with customers and providing services.

The customers with the endpoint devices 102-104 may then access Internet services from the IP core network 110, and may also access P2P applications from LAN 108. For example, the customer endpoint device 102 may communicate with the application server 214 through the access network 211, IP core network 110, and the LAN 108.

In one embodiment, the method first enables the P2P application to determine the physical location of the customer endpoint device. For example, the P2P application in customer endpoint device 102 determines the physical location of the customer endpoint device 102. Similarly, the P2P application in customer endpoint device 103 determines the physical location of the customer endpoint device 103, and the P2P application in customer endpoint device 104 determines the physical location of the customer endpoint device 104.

In one embodiment, the P2P application in the endpoint device 102, 103 or 104 may receive the physical location from the user of the particular customer endpoint device when the application is either being invoked or being installed. For example, the user may be requested to enter the physical location, in a form of a street address, city, state, or zip code. Responsive to the query, the user may then enter the requested physical location.

In one embodiment, the P2P application in an endpoint device 102, 103 or 104 may receive the physical location from a stored file located in the endpoint device. For example, a configuration file of the endpoint device may contain an address previously entered by the user.

In one embodiment, the P2P application in the endpoint device 102, 103 or 104 may receive the physical location from another device, such as a GPS. In turn, the P2P application in the customer endpoint device 102, 103 or 104 may then provide the physical location to the application server 214 located in LAN 108.

In one embodiment, the application server 214 may gather and track information for all users of the P2P application. The gathered information for each user of a P2P application may comprise: an IP address, the Internet Service Provider (ISP) serving the user, and the known physical location of the user. Table-1 provides an exemplary table for tracking information for P2P application users.

TABLE 1

| User | IP address | Service Provider | Physical Location |
|---|---|---|---|
| Customer A (Device 102) | 123.222.7.nn | ISP aa | 1 Main st., Town 1, State 1, 00000 |
| Customer B (Device 103) | 123.45.222.n | ISP bb | 20 Main st., Town 1, State 1, 00000 |
| Customer C (Device 104) | 123.4.222.nn | ISP aa | 5 Main st., Town 2, State 2, 22222 |

In one embodiment, the method in the customer endpoint device 102, 103 or 104 may then query the application server 214 for peering information. For example, the P2P application in the customer endpoint device 102 may send a request to the P2P application server 214 to obtain a list of peer customer endpoint devices that may have a desired content. In turn, the application server 214 will provide a list of peers and their corresponding known information. For example, the known information may comprise each peer's physical location and ISP. For the example above, the application server 214 provides to the customer endpoint device 102 a list of peers that comprises the customer endpoint devices 103 and 104, along with their respective physical location and ISP.

In one embodiment, the method in the customer endpoint device 102, 103 or 104 may arrange the peer customer endpoint devices on the received list in an order that is in accordance with one or more preferences. For example, the method may order the peer customer endpoint devices based on service provider (e.g., ISP). For example, a peer endpoint device served by the same ISP may be preferred over another peer endpoint device that is served by a different ISP. For the example in Table-1, customers A and C are served by the same ISP aa. Therefore, the P2P application in the customer endpoint device 102 (being used by customer A) may place Customer C's endpoint device 104 ahead of customer B's endpoint device 103. That is, the preference is to share content with customer C, if possible.

In one embodiment, the method may order the received peer endpoint devices based on physical proximity. For example, the method may first calculate air mileages between its own physical location and the physical location of each of the received peer endpoint devices. The method may then order the received peer endpoint devices from the closest distance to the farthest distance from the endpoint device's own location. For the example in Table-1, the physical locations of the customer endpoint devices 102 and 103 indicate that the devices are physically located in the same state, town and street. Thus, the air mileage between the customer endpoint device 102 and 103 will be significantly less than the air mileage between the customer endpoint devices 102 and 104. The method may then order the peer endpoint devices based on their proximity and place the peer using customer endpoint device 103 ahead of the peer using customer endpoint device 104. That is, the P2P application in the customer endpoint device 102 will order the list of peers with a preference for the customer endpoint device 103 over the customer endpoint device 104.

In one embodiment, the method may then select one of the peer endpoint devices based on the order. For the example above, the method may select the peer listed as being first in accordance with the preference. The method may then interact with the selected peer. For example, the P2P application in the customer endpoint device 102 may share content with the selected peer (e.g., customer endpoint device 103 or 104).

Figure 3:
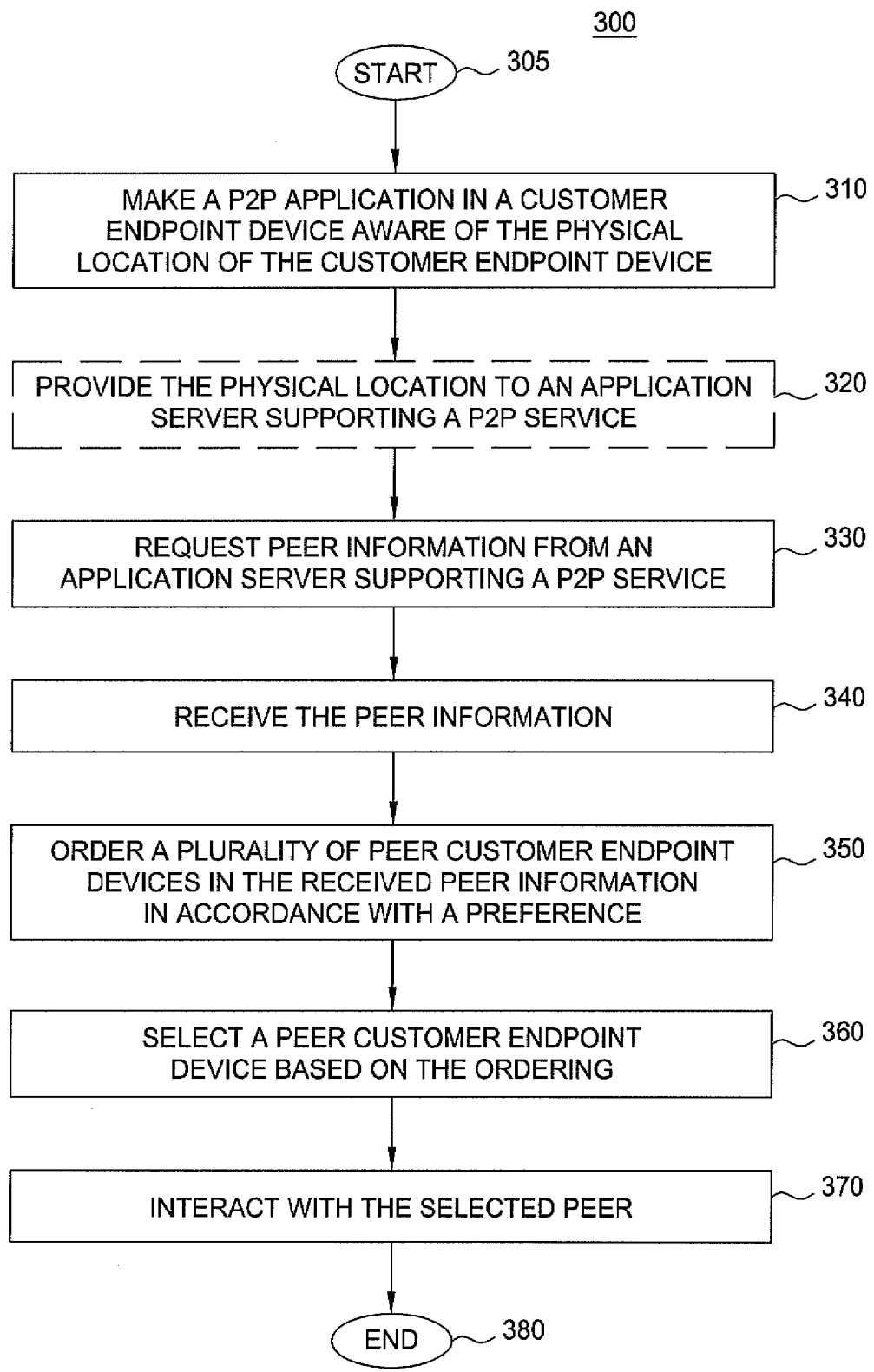
FIG. 3 illustrates a flowchart of a method for providing peer selection in a network.

FIG. 3 illustrates a flowchart 300 of the method for providing peer selection in a network. For example, one or more steps of step 300 may be implemented in a customer endpoint device. Method 300 starts in step 305 and proceeds to step 310.

In step 310, method 300 makes a Peer-to-Peer (P2P) application in a customer endpoint device aware of the physical location of the customer endpoint device. For example, when the P2P application is being installed or being run, the application may receive the physical location from a user of the customer endpoint device. In another example, the P2P application may fetch the physical location from a stored file in the customer endpoint device. In another example, the P2P application may receive the physical location of the customer endpoint device from a Global Positioning System (GPS), wherein the GPS may be either attached to or embedded in the customer endpoint device.

In an optional step 320, method 300 provides the physical location to an application server supporting the P2P service. For example, the physical location of the customer endpoint device may be provided to an application server located in an enterprise network supporting the desired P2P service. For example, if the P2P application is a VoIP service, a server located in the enterprise network may then be supporting the VoIP service. Each customer endpoint device may then provide to the VoIP server the physical location of the customer endpoint device on which the P2P application is running.

In step 330, method 300 requests peer information from an application server supporting a P2P service. For example, the P2P application in the customer endpoint device may send a request to the P2P application server seeking to obtain a list of one or more peers that may have a desired content.

In step 340, method 300 receives the peer information. For example, the method may receive a list of one or more peer customer endpoint devices (broadly peer endpoint devices) along with a physical address and/or a service provider for each peer customer endpoint device on the list.

In step 350, method 300 orders a plurality of peer customer endpoint devices in the received peer information in accordance with one or more preferences. In one embodiment, the method orders the received peer customer endpoint devices based on their respective service provider.

In one embodiment, the method orders the received peer customer endpoint devices based on their physical proximity to the customer endpoint devices running the P2P application. For example, the method may first calculate air mileage between the physical location of the customer endpoint device on which it is running the P2P application, and the physical location of each of the received peer customer endpoint devices. The method may then order the received peer customer endpoint devices from the closest to the farthest from its own location.

In step 360, method 300 selects a peer customer endpoint device based on the ordering. For the example above, the method may select the peer listed as being first in accordance with a particular preference.

In step 370, method 300 interacts with the selected peer. For example, the P2P application in the customer endpoint device may share content with the selected peer. The method then ends in step 380.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
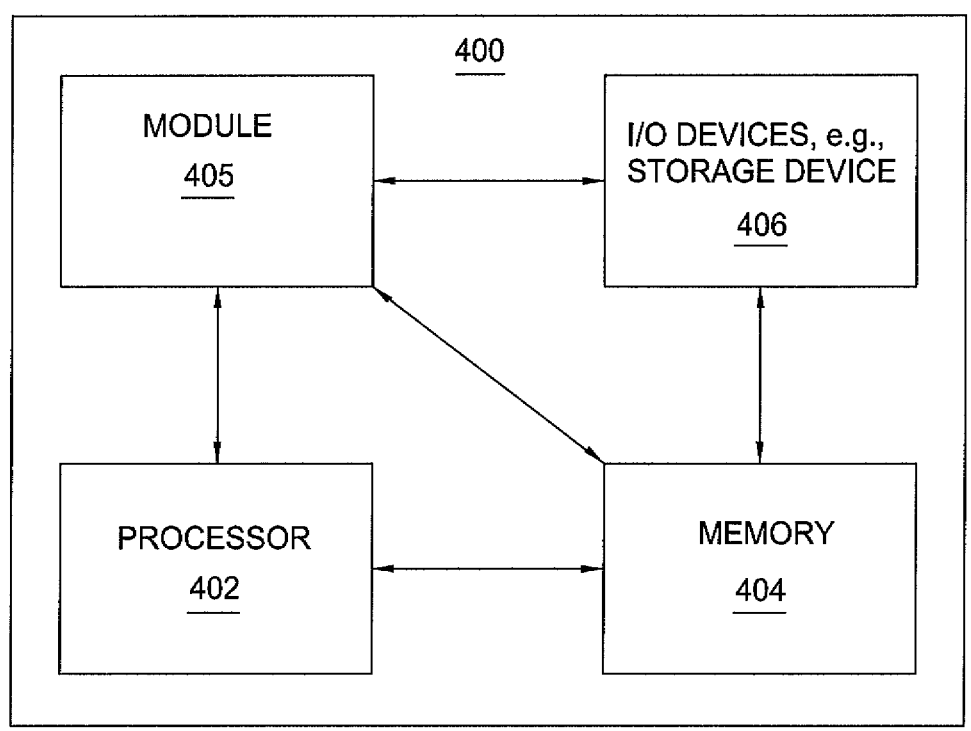
FIG. 4 illustrates a high level block diagram of a general purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing peer selection in a network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing peer selection in a network can be loaded into memory 404 and executed by processor 402 to implement the functions as discussed above. As such, the present method 405 for providing peer selection in a network (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing peer selection in a network, comprising:

requesting, by the first endpoint device, peer information from an application server supporting a peer-to-peer service, wherein a physical location of the first endpoint device is used by the application server for supporting the peer-to-peer service;

receiving, by the first endpoint device, the peer information comprising a plurality of peer endpoint devices; and selecting, by the first endpoint device, a peer endpoint device from the plurality of peer endpoint devices based on a preference, wherein the preference is based on a physical proximity.

2. The method of claim 1, further comprising:
interacting with the peer endpoint device for sharing content.

3. The method of claim 1, wherein the selecting comprises:
arranging the plurality of peer endpoint devices into an order in accordance with the preference; and
selecting the peer endpoint device from the plurality of peer endpoint devices based on the order.

4. The method of claim 1, wherein the physical location of the first endpoint device is obtained from a user of the first endpoint device.

5. The method of claim 1, wherein the physical location of the first endpoint device is obtained from a file stored in the first endpoint device.

6. The method of claim 1, wherein the physical location of the first endpoint device is obtained from a device that is capable of automatically determining the physical location.

7. The method of claim 1, wherein the peer information further comprises, a physical location for each of the plurality of peer endpoint devices.

8. The method of claim 1, wherein the physical proximity is determined by calculating air mileages between the physical location of the first endpoint device and each of the plurality of peer endpoint devices.

9. The method of claim 1, wherein the preference is based on a combination of the physical proximity and a service provider for each of the plurality of peer endpoint devices.

10. The method of claim 1, wherein the peer information further comprises an internet protocol address for each of the plurality of peer endpoint devices.

11. The method of claim 1, wherein the peer information further comprises a service provider for each of the plurality of peer endpoint devices.

12. A non-transitory computer-readable medium storing a plurality of instructions which, when executed by a processor, cause the processor to perform operations for providing peer selection in a network, the operations comprising:
requesting, by the first endpoint device, peer information from an application server supporting a peer-to-peer service, wherein a physical location of the first endpoint device is used by the application server for supporting the peer-to-peer service;
receiving, by the first endpoint device, the peer information comprising a plurality of peer endpoint devices; and
selecting, by the first endpoint device, a peer endpoint device from the plurality of peer endpoint devices based on a preference, wherein the preference is based on a physical proximity.

13. The non-transitory computer-readable medium of claim 12, further comprising:
interacting with the peer endpoint device for sharing content.

14. The non-transitory computer-readable medium of claim 12, wherein the selecting comprises:
arranging the plurality of peer endpoint devices into an order in accordance with the preference; and
selecting the peer endpoint device from the plurality of peer endpoint devices based on the order.

15. The non-transitory computer-readable medium of claim 12, wherein the physical location of the first endpoint device is obtained from a user of the first endpoint device.

16. The non-transitory computer-readable medium of claim 12,
wherein the physical location of the first endpoint device is obtained from a file stored in the first endpoint device.

17. An apparatus for providing peer selection in a network, comprising:
a processor; and
a computer-readable medium storing a plurality of instructions which, when executed by the processor, cause the processor to perform operations, the operations comprising:
requesting, by the first endpoint device, peer information from an application server supporting a peer-to-peer service, wherein a physical location of the first endpoint device is used by the application server for supporting the peer-to-peer service;
receiving, by the first endpoint device, the peer information comprising a plurality of peer endpoint devices; and
selecting, by the first endpoint device, a peer endpoint device from the plurality of peer endpoint devices based on a preference, wherein the preference is based on a physical proximity.

18. The apparatus of claim 17, further comprising:
interacting with the peer endpoint device for sharing content.

19. The apparatus of claim 17, wherein the selecting comprises:
arranging the plurality of peer endpoint devices into an order in accordance with the preference; and
selecting the peer endpoint device from the plurality of peer endpoint devices based on the order.

20. The apparatus of claim 17, wherein the physical location of the first endpoint device is obtained from a user of the first endpoint device.

* * * * *